United States Patent
Mone et al.

(10) Patent No.: US 12,519,557 B2
(45) Date of Patent: Jan. 6, 2026

(54) APPARATUS AND METHOD FOR MODELLING OF PASSIVE CONNECTORS AND A ONE-TOUCH ROADM OPTICAL NETWORK

(71) Applicant: Infinera Corp., San Jose, CA (US)

(72) Inventors: Thirumala Raju Mone, Bangalore (IN); Himabindu Uppalapati, Ongole (IN); Shaheba Memon, Bangalore (IN)

(73) Assignee: Infinera Corp.

( * ) Notice: Subject to any disclaimer, the term of this patent is extended or adjusted under 35 U.S.C. 154(b) by 279 days.

(21) Appl. No.: 18/313,066

(22) Filed: May 5, 2023

(65) Prior Publication Data
US 2023/0358970 A1   Nov. 9, 2023

Related U.S. Application Data

(60) Provisional application No. 63/338,783, filed on May 5, 2022.

(51) Int. Cl.
*G02B 6/44* (2006.01)
*H04J 14/02* (2006.01)

(52) U.S. Cl.
CPC ......... *H04J 14/021* (2013.01); *G02B 6/4472* (2013.01); *H04J 14/02126* (2023.08)

(58) Field of Classification Search
CPC ............................. G02B 6/4472; H04J 14/021
See application file for complete search history.

(56) References Cited

U.S. PATENT DOCUMENTS

| | | | | |
|---|---|---|---|---|
| 2012/0328239 A1* | 12/2012 | Fuerst | ................ | H04J 14/0258 385/20 |
| 2014/0270762 A1* | 9/2014 | Li | ........................ | H04L 45/02 398/45 |
| 2015/0055952 A1* | 2/2015 | Younce | ............... | H04J 14/0217 398/83 |
| 2015/0256908 A1* | 9/2015 | Zhu | ........................ | H04L 45/62 398/85 |
| 2020/0028765 A1* | 1/2020 | Schmogrow | ........ | H04J 14/0272 |

OTHER PUBLICATIONS

DTN/DTN-X Theory of Operations Release 16.0, retrieved via https://infiniumnet.com/PublicDocs/r16-0-dtn-dtnx-flex-theory-of-operations-23-may-2016-pr_2dce92e0e1c7155079045666fd967fd4.pdf, dated 2015. (Year: 2015).*

* cited by examiner

*Primary Examiner* — Michael Stahl

(57) ABSTRACT

A node comprises an FSP, a first FRU, a second FRU, and a controller. The FSP has a first connector having first port pairs and a second connector having second port pairs, a second port pair is optically coupled to at least one first port pair. The first FRU has third port pairs and a third connector coupled to the first connector. The second FRU has fourth port pairs and a fourth connector coupled to the second connector. The controller comprises a processor and a memory storing an FSP map and instructions, including: receive a first association between a third port pair and one of the first connector and the second connector; validate the first association; generate an FRU map based on the first association and the FSP map; update a mode type for each second association; receive a service activation request; and cause an FRU to activate the service.

20 Claims, 8 Drawing Sheets

APPARATUS AND METHOD FOR MODELLING OF PASSIVE CONNECTORS AND A ONE-TOUCH ROADM OPTICAL NETWORK

CROSS-REFERENCE TO RELATED APPLICATIONS

This application claims priority to U.S. Provisional Patent Application No. 63/387,783, filed May 5, 2022, the entire content of which is incorporated herein by reference in its entirety.

DESCRIPTION OF THE PRIOR ART

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation, and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems.

The ever-growing needs of bandwidth results in additional fiber optical connections between ROADMs. Traditionally, the fiber optical connections are modeled in software such that any change in the fiber optical connection in a node results in the user having to manually update the model in the software, thereby increasing the likelihood of introducing errors in the node configuration. As the number of connections increases in the optical network, the number of manually updated associations also increases, even further increasing the likelihood of introducing errors in the node configuration.

SUMMARY OF THE INVENTION

Therefore, what is needed is a connection agnostic provisioning process to enable interconnectivity across FRU boundaries with complete modeling of the interconnectivities of each connector of the FRU. In this way, the ports of the FRU are not hardcoded into the specific software implementation. Further, the systems and methods disclosed herein enable interconnectivity and auto-provisioning of field replaceable units (FRUs), e.g., by a "one-touch" ROADM provisioning system in which the user need only provision one association between the FSP and an FRU.

In one implementation, the problems of implementing a connection agnostic provisioning process is solved by a node disclosed herein. The node comprises a fiber shuffle panel, a first field replaceable unit, a second field replaceable unit, and a node controller. The fiber shuffle panel comprises a first connector having a plurality of first optical port pairs and a second connector having a plurality of second optical port pairs where at least one of the second optical port pairs is optically coupled to at least one of the plurality of first optical port pairs. The first field replaceable unit has a plurality of third optical port pairs and a third connector optically coupled to the first connector via a first fiber optic cable. The second field replaceable unit has a plurality of fourth optical port pairs and a fourth connector optically coupled to the second connector via a second fiber optic cable. The node controller comprises a node processor and a node memory. The node memory comprises a non-transitory processor-readable medium storing a Fiber Shuffle Pair (FSP) map data and processor-executable instructions that when executed by the node processor cause the node processor to: receive a first association between at least one of the third optical port pairs and one of the first connector and the second connector; validate the first association; generate an FRU map data based on the first association and the FSP map data; the FRU map data comprising a plurality of second associations between each of the plurality of third optical port pairs and the plurality of fourth optical port pairs; update a mode type for each of the second associations; receive an activation request to activate one or more service; and cause one or more field replaceable unit to activate the one or more service, wherein the FSP map data comprises a plurality of third associations between each of the plurality of first optical port pairs and the plurality of second optical port pairs.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1:
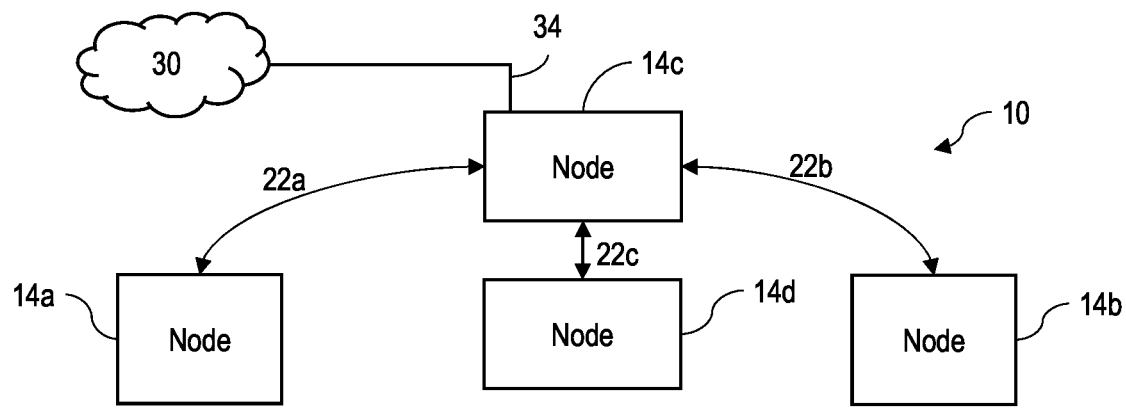
FIG. 1 is a block diagram of an exemplary implementation of an optical transport network constructed in accordance with the present disclosure.

The following detailed description of exemplary embodiments/implementations refers to the accompanying drawings. The same reference numbers in different drawings may identify the same or similar elements.

Before explaining at least one implementation of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other implementations or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments/implementations herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory processor-readable mediums, such as a memory. Exemplary non-transitory memory may include random access memory, read-only memory, flash memory, and/or the like. Such non-transitory memory may be electrically based, optically based, and/or the like.

Software, or software modules/applications, may include one or more processor-readable instruction that when executed by one or more component, e.g., a processor, causes the component to perform a specified function. It should be understood that the algorithms described herein may be stored on one or more non-transitory processor-readable medium, which is also referred to herein as a memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A Wavelength Selective Switch is a programmable device having source and destination fiber ports where the source and destination fiber ports and associated attenuation can be specified for a particular passband with a minimum bandwidth. The minimum bandwidth may be, for example, a slice. In one implementation, for example, the wavelength selective switch is operable to apply an attenuation for a particular passband having a first bandwidth and the optical power monitoring device has a resolution of a second bandwidth. The first bandwidth and the second bandwidth may be different (for example, the first bandwidth may be 12.5 GHZ and the second bandwidth may be 3.125 GHZ). In this implementation, then, the WSS may have a different slice width than the optical power monitor slice width.

A reconfigurable optical add-drop multiplexer (ROADM) node is an all-optical subsystem that enables remote configuration of wavelengths at any ROADM node, in other words, a ROADM enables optical switching of an optical signal without requiring conversion of the optical signal from an optical domain into an electrical or digital domain. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS), Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

Referring now to the drawings, and in particular to FIG. 1, shown therein is a diagram of an exemplary implementation of an optical transport network 10 constructed in accordance with the present disclosure. The optical transport network 10 is depicted as having a plurality of nodes 14a-n, including a first node 14a, a second node 14b, a third node 14c, and a fourth node 14d. Though four nodes 14 are shown for exemplary purposes, it will be understood that the plurality of nodes 14a-n may comprise more or fewer nodes 14. Data transmitted within the optical transport network 10 from the first node 14a to the second node 14b may travel along an optical path formed from a first optical fiber link 22a, the third node 14c, and, a second optical fiber link 22b to the second node 14b. In one implementation, the first node 14*a* may be considered a single chassis with a single-node node controller and the third node 14*c* may be considered a multi-chassis node controller supplying two shelf controllers (e.g., node controllers 30 associated with the second node 14*b* and the fourth node 14*d*).

In one embodiment, a user may interact with a node controller 30, e.g., via a user device, that may be used to communicate with one or more of the nodes 14*a-n* via a communication network 34. In one implementation, when the node controller 30 is integrated with a particular node 14 established as a chassis expansion or chassis shelf, the node controller 30 may be a shelf controller.

In some implementations, the node controller 30 (described below in reference to FIG. 2 in more detail) may comprise a processor and a memory having a data store that may store data such as node version information, firmware version information, sensor data, system data, metrics, logs, tracing, FRU map data, FRM map data, and the like in a raw format as well as transformed data that may be used for tasks such as reporting, visualization, analytics etc. The data store may include structured data from relational databases, semi-structured data, unstructured data, time-series data, and binary data. The data store may be a database (e.g., as described below), a remote accessible storage, or a distributed filesystem. In some embodiments, the data store may be a component of an enterprise network. In In some implementations, the node controller 30 is connected to one or more node 14 via the communication network 34. In this way, the node controller 30 may communicate with each of the one or more node 14, and may, via the communication network 34 transmit or receive data from each of the one or more node 14. In other embodiments, the node controller 30 may be integrated into each node 14 and/or may communicate with one or more pluggable card within the node 14. In some embodiments, the node controller 30 may be a remote one of the node 14.

The communication network 34 may permit bi-directional communication of information and/or data between the node controller 30 and/or one or more of the nodes 14 of the optical transport network 10. The communication network 34 may interface with the node controller 30 and/or the nodes 14 in a variety of ways. For example, in some embodiments, the communication network 34 may interface by optical and/or electronic interfaces, and/or may use a plurality of network topographies and/or protocols including, but not limited to, Ethernet, TCP/IP, circuit switched path, combinations thereof, and/or the like. The communication network 34 may utilize a variety of network protocols to permit bi-directional interface and/or communication of data and/or information between the node controller 30 and/or the nodes 14.

The communication network 34 may be almost any type of network. For example, in some embodiments, the communication network 34 may be a version of an Internet network (e.g., exist in a TCP/IP-based network). In one embodiment, the communication network 34 is the Internet. It should be noted, however, that the communication network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 34 is the Internet, a primary user interface of the node controller 30 may be delivered through a series of web pages or private internal web pages of a company or corporation, which may be written in hypertext markup language, JavaScript, or the like, and accessible by the user. It should be noted that the primary user interface of the node controller 30 may be another type of interface including, but not limited to, a Windows-based application, a tablet-based application, a mobile web interface, a VR-based application, an application running on a mobile device, and/or the like. In one embodiment, the communication network 34 may be connected to one or more of the user devices, node controller 30, and the nodes 14.

The optical transport network 10 may be, for example, considered as a graph made up of interconnected individuals of the nodes 14. If the optical transport network 10 is an optical transport network, the optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10. Devices of the node controller 30 may interconnect via wired connections, wireless connections, or a combination thereof. For example, in one embodiment, the user device and the node controller 30 may be integrated into the same device, that is, the user device may perform functions and/or processes described as being performed by the node controller 30, described below in more detail.

Figure 2:
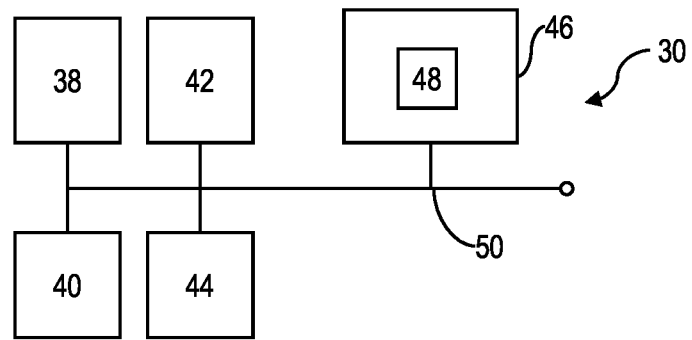
FIG. 2 is a diagram of an exemplary implementation of a computer system constructed in accordance with the present disclosure.

Referring now to FIG. 2, shown therein is a diagram of an exemplary implementation of the node controller 30 constructed in accordance with the present disclosure. In some embodiments, the node controller 30 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the node controller 30 may include one or more input devices 38 (hereinafter "input device 38"), one or more output devices 40 (hereinafter "output device 40"), one or more node processors 42 (hereinafter "node processor 42"), one or more communication devices 44 (hereinafter "communication device 44") capable of interfacing with the communication network 34, one or more non-transitory processor-readable medium (hereinafter "node memory 46") storing processor-executable code and/ or software application(s) 48, for example including, a web browser capable of accessing a website and/or communicating information and/or data over a wireless or wired network (e.g., the communication network 34), and/or the like. The input device 38, the output device 40, the node processor 42, the communication device 44, and the node memory 46 may be connected via a path 50 such as a data bus that permits communication among the components of the node controller 30. The node processor 42 executing the software application 48 stored in the node memory 46 may become a special-purpose machine particularly suited for performing various actions, operations, analyses, and/or the like in accordance with the systems and methods described herein and illustrated in the FIGS. 5D, and 7-9.

In some implementations, the node processor 42 may comprise one or more node processor 42 working together, or independently, to read and/or execute processor executable code and/or data, such as stored in the node memory 46. The node processor 42 may be capable of creating, manipulating, retrieving, altering, and/or storing data structures into the node memory 46. Each element of the node controller 30 may be partially or completely network-based or cloud-based, and may or may not be located in a single physical location.

Exemplary implementations of the node processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The node processor 42 may be capable of communicating with the node memory 46 via the path 50 (e.g., data bus). The node processor 42 may be capable of communicating with the input device 38 and/or the output device 40.

The node processor 42 may be further capable of interfacing and/or communicating with the nodes 14 via the communication network 34 using the communication device 44. For example, the node processor 42 may be capable of communicating via the communication network 34 by exchanging signals (e.g., analog, digital, optical, and/or the like) via one or more ports (e.g., physical ports or virtual ports) using a network protocol to provide information to the one or more node 14. In another implementation, the node processor 42 may be capable of interfacing directly with one or more component (e.g., FRU) of the node 14.

The node memory 46 may store a software application 48 that, when executed by the node processor 42, causes the node controller 30 to perform an action such as communicate with, or control, one or more component of the node controller 30, the optical transport network 10 (e.g., the one or more node 14a-n) and/or the communication network 34.

In some implementations, the node memory 46 may be located in the same physical location as the node controller 30, and/or one or more node memory 46 may be located remotely from the node controller 30. For example, the node memory 46 may be located remotely from the node controller 30 and communicate with the node processor 42 via the communication network 34. Additionally, when more than one node memory 46 is used, a first computer system memory may be located in the same physical location as the node processor 42, and additional computer system memory may be located in a location physically remote from the node processor 42. Additionally, the node memory 46 may be implemented as a "cloud" non-transitory processor-readable storage memory (i.e., one or more of the node memory 46 may be partially or completely based on or accessed using the communication network 34).

In one implementation, the node memory 46 may store one or more database. The one or more database may be, for example, a time-series database, a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The one or more database can be centralized or distributed across multiple systems.

The input device 38 may be capable of receiving information input from the user, another computer, and/or the node processor 42, and transmitting such information to other components of the node controller 30 and/or the communication network 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 40 may be capable of outputting information in a form perceivable by the user, another computer system, and/or the node processor 42. For example, implementations of the output device 40 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary implementations, the input device 38 and the output device 40 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

Figure 3:
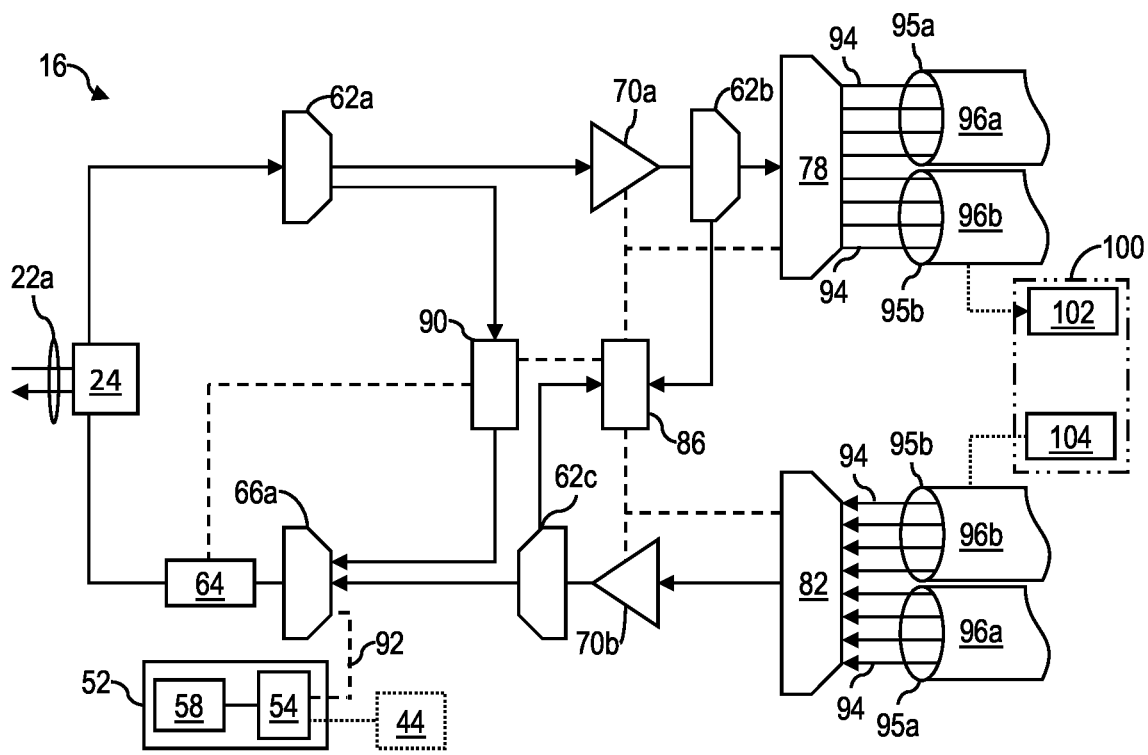
FIG. 3 is a diagrammatic view of an exemplary implementation of a flex ROADM module (FRM) constructed in accordance with the present disclosure.

In one implementation, each node 14 may interconnect one or more flexible ROADM module (FRM). Referring now to FIG. 3, shown therein is a diagrammatic view of an exemplary one of a FRM 16 constructed in accordance with the present disclosure. In general, the FRM 16 is a particular type of field replaceable unit (FRU) operable to transmit and receive data traffic and control signals. An FRU may have an FRU type, such as an FRM, a flexible ROADM switching module (FSM), a flex broadcast module (FBM), and/or the like, for example.

As shown in FIG. 3, the FRM 16 is a flexible ROADM module that connects to the first optical fiber link 22a via a line port 24. Each of the first optical fiber link 22a and the second optical fiber link 22b may include optical fiber pairs, wherein each fiber of the pair carries optical signal groups propagating in opposite directions. In one implementation, the FRM 16 may be a flexible ROADM module within an optical path of the optical transport network 10.

Nonexclusive examples of alternative implementations of the FRM 16 include optical line terminals (OLTs). OLTs may be used at either end of a connection or optical fiber link 22. One or more OADM/ROADMs may be used to add, terminate and/or reroute wavelengths or fractions of wavelengths. Flexible ROADM modules are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

In one implementation, the FRM 16 may be provided with an FRU controller 52 having circuitry, including an FRU processor 54 and an FRU memory 58, for controlling components of the FRM 16. The FRU memory 58 may be a non-transitory processor-readable medium storing processor-executable instructions (e.g., software such as the software application 48) that when executed by the processor cause the FRU processor 54 to perform one or more function or process, as described below. The FRU processor 54 may be implemented in accordance with the node processor 42 described above and the FRU memory 58 may be implemented in accordance with the node memory 46 described above. In one implementation, the FRM 16 may be provided with an interface 92 that connects the FRU controller 52 to the components of the FRM 16 and/or to other optical components of the node 14. In one implementation, the FRU controller 52 may be communicably coupled to the node controller 30, e.g., via the communication device 44 utilizing the communication network 34. The FRU controller 52 may be operable to execute a service activation request, for example, received via the communications network 34 or from the node controller 30. The service activation request may cause data to be encoded within an optical signal and transmitted within the optical transport network 10, as discussed below in more detail. In one implementation, the service activation request may include a service type being one of an express type and an add/drop type.

In one implementation, the FRM 16 may further be provided with a first optical splitter 62a, a second optical splitter 62b, a third optical splitter 62c, a first optical combiner 66a, a first optical amplifier 70a, a second optical amplifier 70b, a demux WSS 78, a mux WSS 82, an optical signal inspector 86, and an optical supervisory channel (OSC) 90.

In one implementation, each output of the demux WSS 78 and each input to the mux WSS 82 may be provided separately on a fiber optic line 94. In some implementations, multiples of the fiber optic lines 94 associated with one or more output may be combined with multiples of the fiber optic lines 94 associated with one or more input into a connector cable 96 via connector port 95. For example, four of the fiber optic lines 94 provided for output from the demux WSS 78 and four of the fiber optic lines 94 provided for input to the mux WSS 82 may be combined into a first connector cable 96a coupled to a first connector port 95a, while a second four of the fiber optic lines 94 provided for output from the demux WSS 78 and a second four of the fiber optic lines 94 provided for input to the mux WSS 82 may be combined into a second connector cable 96b coupled to a second connector port 95b. While the fiber optic lines 94 are shown as being combined into the connector cable 96 via the connector port 95, in other implementations, a different standard may be used in place of the connector cable 96 and the connector port 95.

In one implementation, the FRM 16 may be optically coupled to one or more coherent optical transceiver 100 having at least one drop-transceiver 102 (described below in more detail and shown in FIG. 4A) and at least one add-transceiver 104 (described below in more detail and shown in FIG. 4B). The at least one coherent optical transceiver 100 may be in communication with the FRM 16 (e.g., via the second connector cable) to add and drop optical signals.

It should be noted that the elements of the FRM 16 are shown for illustration purposes only and should not be considered limiting. For instance, the FRM 16, as shown, is one possible realization of a single degree of a ROADM. However, the FRM 16 may be implemented as a multi-degree ROADM with a launch power for each optical fiber link 22 serviced by the FRU controller 52 of the FRM 16 implemented in accordance with the inventive concepts described herein. Further, the at least one add-transceiver 104 and the at least one drop-transceiver 102 may be implemented as a line card having multiple add and drop transceivers and may be configured to service channels across multiple ROADM degrees.

The optical signal inspector 86 provides the ability to monitor a power level at one or more sample frequency of the optical signal with a sample resolution. The sample resolution may be, for example, between 12.5 GHZ and 0.3125 GHZ. In other implementations, the sample resolution may be less than 0.3125 GHZ, for example, 0.15625 GHz or 78.125 MHz. The optical signal inspector 86 may determine the power level of each spectral slice for the optical signal based on the sample frequency for each spectral slice. The optical signal inspector 86 can be implemented as an optical power monitor, for example.

In one implementation, the FRU processor 54 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The FRU processor 54 is in communication with the FRU memory 58 and may be operable to read and/or write to the FRU memory 58.

In one implementation, the optical signal inspector 86 can also be used to troubleshoot the optical transport network 10. Recent innovations include flexible-grid optical channel monitors (OCMs) and higher-resolution coherent OCMs. Coherent OCMs offer sub-GHz frequency accuracy and highly accurate power monitoring of fine spectral slices independent of adjacent channel power. Coherent OCMs reduce the C-band scanning time from seconds to hundreds of milliseconds and provide advanced processing of spectral characteristics, such as valid channel detection, center wavelength, and optical signal-to-noise ratio (OSNR).

In one implementation, the OSC 90 provides a communication channel between adjacent nodes, such as the first node 14a and the second node 14b, that can be used for functions including link control, in-band management, control plane (i.e., ASON/GMPLS), and span loss measurement. Static information about physical properties of the optical fiber link 22 (fiber types, loss, amplifier types, etc.) downstream from the node 14 can be communicated to the FRU controller 52 via the OSC 90.

The FRM 16 may include one or more wavelength selective switch, shown as the mux WSS 82 and the demux WSS 78. As described above, wavelength selective switches are components that can dynamically route, block and/or attenuate received optical signals input from and output to optical fiber links 22a-n. In addition to transmitting and/or receiving optical signals from the node 14, optical signals may also be input from or output to the at least one add-transceiver 104 and the at least one drop-transceiver 102, respectively.

In one implementation, each WSS 78, 82 may be a reconfigurable, optical filter operable to allow one or more passbands (e.g., particular bandwidth(s) of the spectrum of the optical signal) to pass through or be routed as herein described.

In one implementation, the demux WSS 78 may be a DEMUX WSS, e.g., can receive optical signals and may be operable to selectively switch, or direct, such optical signals to one or more other WSS for output from the FRM 16. The demux WSS 78 may also selectively or controllably supply optical signals to the drop-transceiver 102. The mux WSS 82 may be a MUX WSS, e.g., operable to selectively receive optical signals from the add-transceiver 104 in the coherent optical transceiver 100 and from one or more express path, e.g., from the first connector cable 96a from an upstream FRM 16. The optical signals output from the add-transceiver 104 and/or from the express path may be selectively supplied to the mux WSS 82 for output to the first optical fiber link 22a.

In one implementation, the demux WSS 78, may be referred to as a DEMUX module and may apply attenuations and filtering to an incoming optical signal before demultiplexing the incoming optical signal into one or more express optical signal or one or more drop optical signal.

In one implementation, the first optical amplifier 70a and/or the second optical amplifier 70b may be any optical amplifier configured to increase or supplement an optical power of the optical signal. For example, one or more of the first optical amplifier 70a and the second optical amplifier 70b may be an Erbium doped fiber amplifier (EDFA). In one implementation, one or more of the first optical amplifier 70a and the second optical amplifier 70b may further include a variable optical attenuator.

In one implementation, the FRM 16 further includes a variable optical attenuator 64 (e.g., VOA 64). The VOA 64 is an optical device operable to control attenuation (or insertion loss) according to an electrical control signal (e.g., received from the FRU processor 54 of the FRU controller 52).

As shown in FIG. 3, a first optical signal enters the FRM 16 via the first optical fiber link 22a and passes through the first optical amplifier 70a before being split at the second optical splitter 62b where a sample portion of the first optical signal is directed to the optical signal inspector 86 while a remainder of the first optical signal continues to the demux WSS 78.

In one implementation, the optical signal inspector 86 and the OSC 90 are shared for both directions of the first optical fiber link 22a. In other implementations, however, each direction may have a dedicated OSC 90 and/or a dedicated optical signal inspector 86.

The number of devices illustrated in FIG. 3 is provided for explanatory purposes. In practice, there may be additional devices, fewer devices, different devices, or differently arranged devices than are shown in FIG. 3. Furthermore, two or more of the devices illustrated in FIG. 3 may be implemented within a single device, or a single device illustrated in FIG. 3 may be implemented as multiple, distributed devices. Additionally, one or more of the devices illustrated in FIG. 3 may perform one or more function described as being performed by another one or more of the devices illustrated in FIG. 3.

Figure 4A:
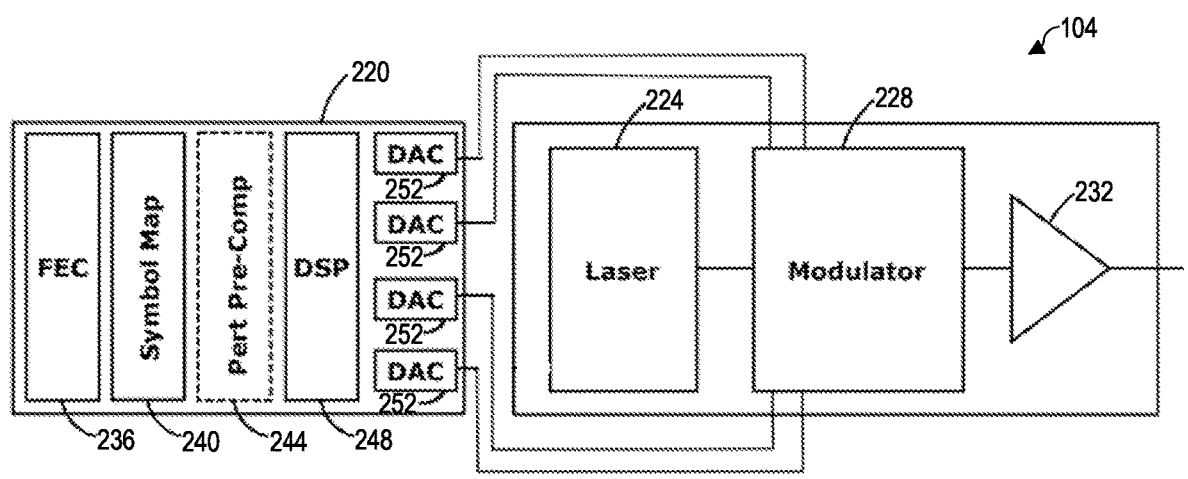
FIG. 4A is a diagram of an exemplary implementation of an add-transceiver of FIG. 3 constructed in accordance with the present disclosure.

Referring now to FIG. 4A, shown therein is a diagram of an exemplary implementation of the add-transceiver 104 of FIG. 2 constructed in accordance with the present disclosure. The add-transceiver 104 may comprise one or more transmitter processor circuit 220, one or more laser 224, one or more modulator 228, one or more semiconductor optical amplifier 232, and/or other components (not shown). In one implementation, the add-transceiver 104 is a coherent optical transceiver. In one implementation, the add-transceiver 104 may have a transceiver bandwidth, such as 100 GHz, 200 GHz, or 400 GHz, for example.

The transmitter processor circuit 220 may have a Transmitter Forward Error Correction (FEC) circuitry 236, a Symbol Map circuitry 240, a transmitter perturbative pre-compensation circuitry 244, one or more transmitter digital signal processor (DSP) 248, and one or more digital-to-analogue converters (DAC) 252. The transmitter processor circuit 220 may be located in any one or more components of the add-transceiver 104, or separate from the components, and/or in any location(s) among the components. The transmitter processor circuit 220 may be in the form of one or more Application Specific Integrated Circuit (ASIC), which may contain one or more module and/or custom module.

Processed electrical outputs from the transmitter processor circuit 220 may be supplied to the modulator 228 for encoding data, such as user data, into optical signals generated and supplied to the modulator 228 from the laser 224. The semiconductor optical amplifier 232 receives, amplifies, and transmits the optical signal including encoded data in the spectrum. Processed electrical outputs from the transmitter processor circuit 220 may be supplied to other circuitry in the transmitter processor circuit 220, for example, clock and data modification circuitry. The laser 224, modulator 228, and/or semiconductor optical amplifier 232 may be coupled with a tuning element (e.g., a heater) (not shown) that can be used to tune the wavelength of an optical signal channel output by the laser 224, modulator 228, or semiconductor optical amplifier 232. In some implementations, a single one of the laser 224 may be shared by multiple add-transceiver(s) 104.

Other possible components in the add-transceiver 104 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 4B:
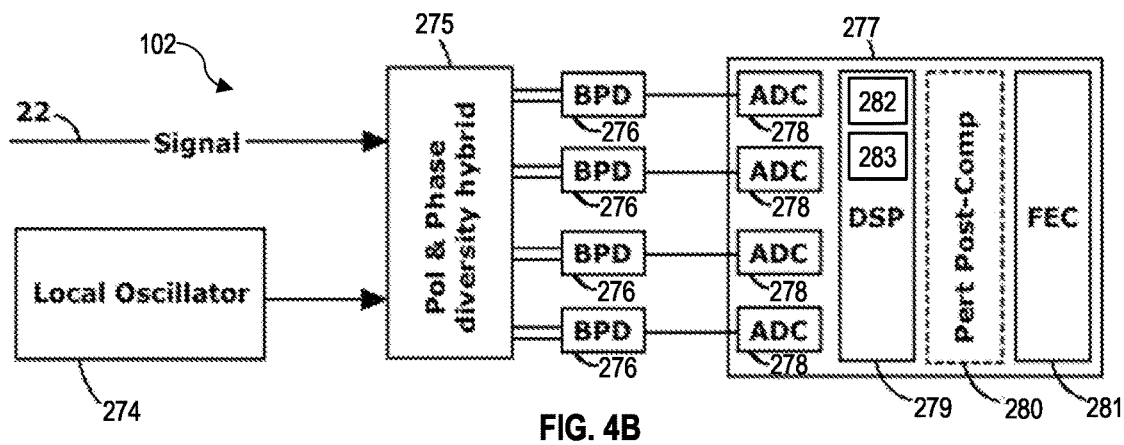
FIG. 4B is a block diagram of an exemplary implementation of a drop-transceiver constructed in accordance with the present disclosure.

Referring now to FIG. 4B, shown therein is a block diagram of an exemplary implementation of the drop-transceiver 102 constructed in accordance with the present disclosure. The drop-transceiver 102 may comprise one or more local oscillator 274, a polarization and phase diversity hybrid circuit 275 receiving the one or more channel from the optical signal and the input from the local oscillator 274, one or more balanced photodiode 276 that produces electrical signals representative of the one or more channel on the spectrum, and one or more receiver processor circuit 277. Other possible components in the drop-transceiver 102 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The drop-transceiver 102 may be implemented in other ways, as is well known in the art. Exemplary implementations of the drop-transceiver 102 are further described in U.S. patent application Ser. No. 12/052,541, titled "Coherent Optical Receiver", the entire contents of which are hereby incorporated by reference.

The one or more receiver processor circuit 277, may comprise one or more analog-to-digital converter (ADC) 278 receiving the electrical signals from the balanced photodiodes 276, one or more receiver digital signal processor (hereinafter, receiver DSP 279), receiver perturbative post-compensation circuitry 280, and receiver forward error correction circuitry (hereinafter, receiver FEC circuitry 281). The receiver FEC circuitry 281 may apply corrections to the data, as is well known in the art. The one or more receiver processor circuit 277 and/or the one or more receiver DSP 279 may be located on one or more component of the drop-transceiver 102 or separately from the components, and/or in any location(s) among the components. The receiver processor circuit 277 may be in the form of an Application Specific Integrated Circuit (ASIC), which may contain one or more module and/or custom module. In one implementation, the receiver DSP 279 may include, or be in communication with, one or more processor 282 and one or more memory 283 storing processor readable instructions, such as software, or may be in communication with the FRU processor 54 and the FRU memory 58.

The one or more receiver DSP 279 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 279 may be supplied to other circuitry in the receiver processor circuit 277, such as the receiver perturbative post-compensation circuitry 280 and the receiver FEC circuitry 281.

Various components of the drop-transceiver 102 may be provided or integrated, in one example, on a common substrate, such as the coherent optical transceiver 100. Further integration is achieved by incorporating various optical demultiplexer designs that are relatively compact and conserve space on the surface of the substrate.

Figure 5A:
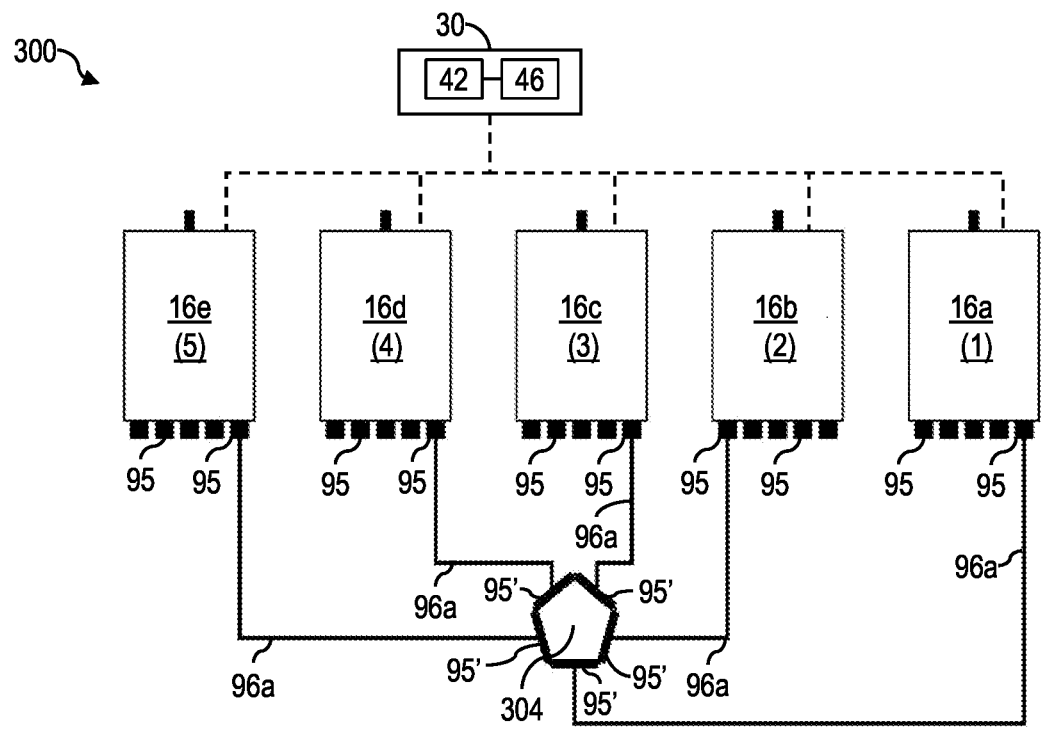
FIG. 5A is a diagram of an exemplary implementation of a flex grid interconnect having a fiber shuffle panel (FSP) constructed in accordance with the present disclosure.

Referring now to FIG. 5A, shown therein is a diagram of an illustrative embodiment of a flex grid interconnect 300 constructed in accordance with the present disclosure. The flex grid interconnect 300 may be a passive connector, for example, interconnecting a plurality of FRMs 16, shown as FRMs 16a-e. As shown in FIG. 5A, each FRM 16 has a plurality of connector ports 95 and the first connector cable 96a extending from at least one of the connector ports 95 to a fiber shuffle panel 304 (hereinafter "FSP" 304). In one implementation, the FSP 304 comprises a plurality of connector ports 95' to receive each of the first connector cables 96a from the FRMs 16a-e. Each connector port 95' may be constructed in accordance with the connector port 95. In one implementation, each connector port 95' and each connector port 95 is a Multi-Fiber Push On Connector (MPO connector port). In one implementation, each FSP has an FSP type. For example, the FSP 304 shown in FIG. 5A may be an Express type. In one implementation, the FSP 304 is an FSP_E_5D_5MPO (Infinera Corporation, San Jose, CA). In other implementations, FSPs having the Express type may include an FSP_EE_9D_13MPO, FSP_E_9D_18MPO, FSP_E_9D_18MPO_M6, and FSP_E_13E_21MPO (Infinera). In one implementation, alternative FSP types may include an MPO Direct type (shown in FIG. 6B) and an FSP-CE type (shown in FIG. 6A).

In one implementation, the FSP 304 is a five-degree fiber shuffle panel, and may be, for example, an express fiber shuffle panel. Generally, and as shown below in relation to FIG. 5B, the FSP 304 "shuffles", e.g., optically couples, each FRM 16 optically connected to the FSP 304 to each other FRM 16 optically connected to the FSP 304 via a series of waveguides, which may not be configurable. In other implementations, such as shown below in relation to FIGS. 7A-B, the FSP 304 may be a fiber switch module with greater than five degrees.

In one implementation, each of the one or more FRM 16 (e.g., the FRMs 16a-e) may be communicably coupled to the node controller 30. That is, the FRU controller 52 may be in communication with the node controller 30 as described above. The node controller 30, in communication with the one or more FRM 16 may transmit one or more control signal to the FRU controller 52 of a particular FRM 16 to cause the FRU controller 52 to change one or more property, e.g., of an optical component of the FRM 16.

Figure 5B:
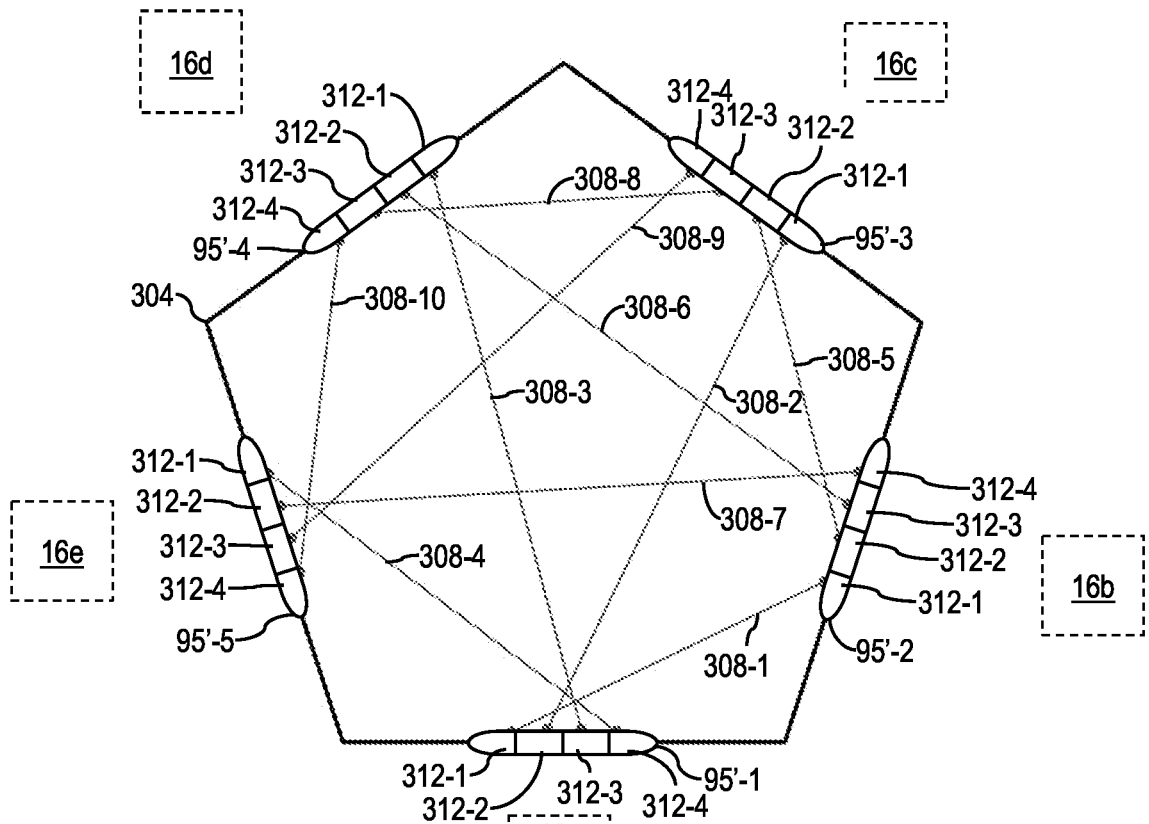
FIG. 5B is a diagram of an exemplary implementation of the fiber shuffle panel of FIG. 5A constructed in accordance with the present disclosure.

Referring now to FIG. 5B, shown therein is a diagram of an illustrative embodiment of the FSP 304 of FIG. 5A constructed in accordance with the present disclosure. The FSP 304 comprises a plurality of optical link pairs 308 extending from each connector port 95' to each other connector port 95'. Each optical link pair 308 is a pair of fiber optic cables and provides bi-directional optical communication for optical signals and may be coupled to a particular FSP port 312 detailed below. Each direction of each optical link pair 308 may be coupled to a particular optical port of each FSP port 312.

For example, as shown in FIG. 5B, the FRM 16a, optically coupled to a first connector port 95'-1, may be optically coupled to the FRM 16b via a first optical link pair 308-1, to the FRM 16c via a second optical link pair 308-2, to the FRM 16d via a third optical link pair 308-3, and to the FRM 16e via a fourth optical link pair 308-4. The FRM 16b, optically coupled to a second connector port 95'-2, may be further optically coupled to the FRM 16c via a fifth optical link pair 308-5, to the FRM 16d via a sixth optical link pair 308-6, and to the FRM 16e via a seventh optical link pair 308-7. The FRM 16c, optically coupled to a third connector port 95'-3, may further be optically coupled to the FRM 16d via an eighth optical link pair 308-8 and to the FRM 16e via a ninth optical link pair 308-9. The FRM 16d, optically coupled to a fourth connector port 95'-4, may further be optically coupled to the FRM 16e via a tenth optical link pair 308-10. The FRM 16e, optically coupled to a fifth connector port 95'-5, may be optically coupled as described above.

Figure 5C:
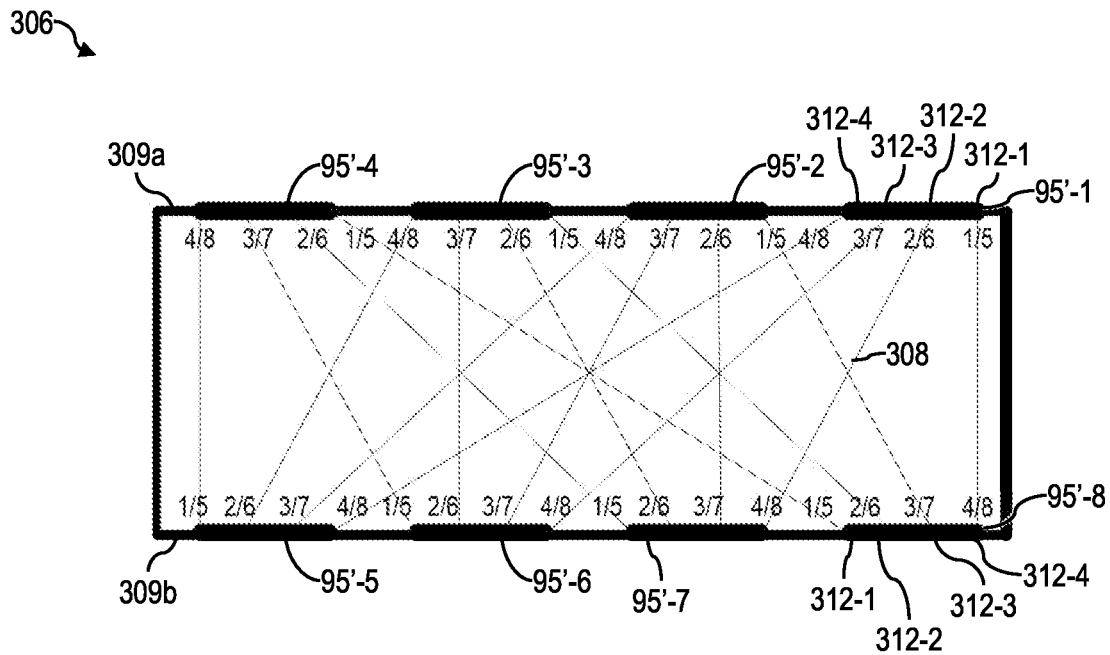
FIG. 5C is a diagram of an exemplary implementation of another fiber shuffle panel constructed in accordance with the present disclosure.
Figure 5D:
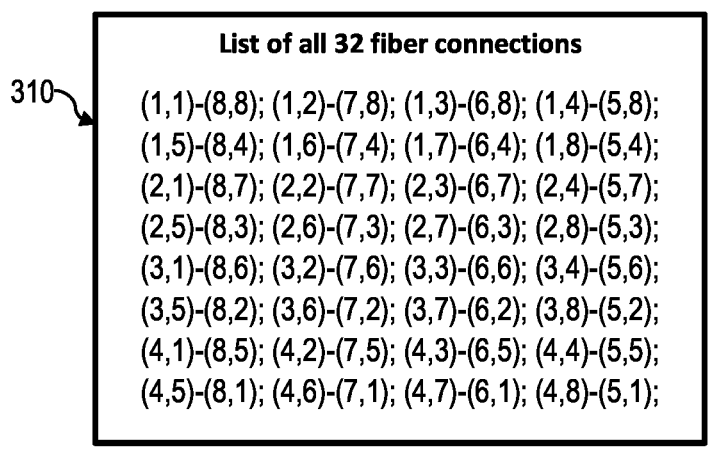
FIG. 5D is a table of an exemplary implementation of an FSP map data of the FSP of FIG. 5C constructed in accordance with the present disclosure.

Referring now to FIGS. 5C and 5D in combination, shown in FIG. 5C is a diagram of an illustrative embodiment of an FSP 306 constructed in accordance with the present disclosure. The FSP 306 comprises a plurality of optical link pairs 308 extending from each connector port 95' on a first side 309a to each connector port 95' on a second side 309b. Each optical link pair 308 is a pair of fiber optic cables and provides bi-directional optical communication for optical signals and may be coupled to a particular FSP port 312. It should be understood that the terms first side 309a and second side 309b are not limiting and are used to indicate a first group of connector ports 95' (e.g., connector ports 95'-1 through 95'-4) as the first side 309a and a second group of connector ports 95' (e.g., connector ports 95'-5 through 95'-8) as the second side 309b. In one implementation, the FSP 306 is an FSP cross-connect, such as an FSP-S-4D-8MPO (Infinera).

In one implementation, as shown in FIG. 5C, each FSP port 312 of each connector port 95' of the first group is optically coupled to a particular FSP port 312 of a different connector port 95' of the second group.

Shown in FIG. 5D is a table of an illustrative embodiment of an FSP map data 310 of the FSP 306 of FIG. 5C constructed in accordance with the present disclosure. As shown, the FSP map data comprises a plurality of associations between each direction of each FSP port 312 of each connector port 95' of the FSP 306 in a format of (first connector port number-optical port number)-(second connector port number-optical port number). For example, the first connector port 95'-1 may have a first connector port number of '1' and the eighth connector port 95'-8 may have a second connector port number of '8', a first optical port of the first connector port 95'-1 may be an optical port of the FSP port 312-1 in a first direction with an optical port number of '1', and an eighth optical port of the eighth connector port 95'-8 may be an optical port of the fourth FSP port 312-4 in the first direction with an optical port number of '8'. In this way, a first FSP association made between the first connector port 95'-1 and the eighth connector port 95'-8 may be formatted as '(1,1)-(8,8)'. In one implementation, because each direction of each optical link pair 308 may be coupled to a particular optical port of each FSP port 312, there may be two times as many FSP associations in the FSP map data as there are FSP ports. In this way, the FSP map data includes an FSP association for each optical fiber in the FSP 306.

Figure 6A:
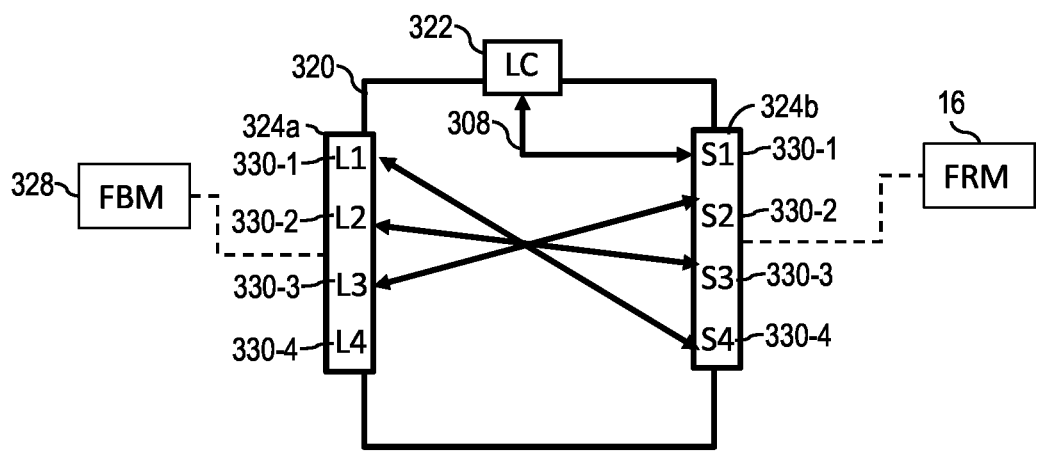
FIG. 6A is a diagram of an exemplary implementation of an FSP constructed in accordance with the present disclosure.

Referring now to FIG. 6A, shown therein is a diagram of an exemplary implementation of an FSP 320 constructed in accordance with the present disclosure. The FSP 320 may have an FSP-CE type, for example, a colorless express FSP, such as an FSP-CE-2MPO-1LC or an FSP-CE-2MPO-2LC (Infinera Corporation, San Jose, CA), e.g., a contentionless express fiber shuffle panel. As shown, the FSP 320 has a first connector port 324a and a second connector port 324b. The first connector port 324a may be optically coupled to a flex broadcast module 328 (hereinafter "FBM" 328), while the second connector port 320b may be optically coupled to a FRM 16. As shown, in this embodiment, at least one of the optical link pair 308 extends from the second connector port 324b to a system port 322, such as an LC port.

In this embodiment, a line port of the FBM 328 may be connected to a system port on the FRM 16 via one or more connectors. For example, the line port of the FBM 328 may be connected to the system port on the FRM 16 by a cross-over cable. As shown in FIG. 6A, a first port 330-1 of the FBM 328 is optically coupled to a fourth port 320-4 of the FRM 16 and a fourth port 330-4 of the FBM 328 is not optically coupled, e.g., cannot be used.

Figure 6B:
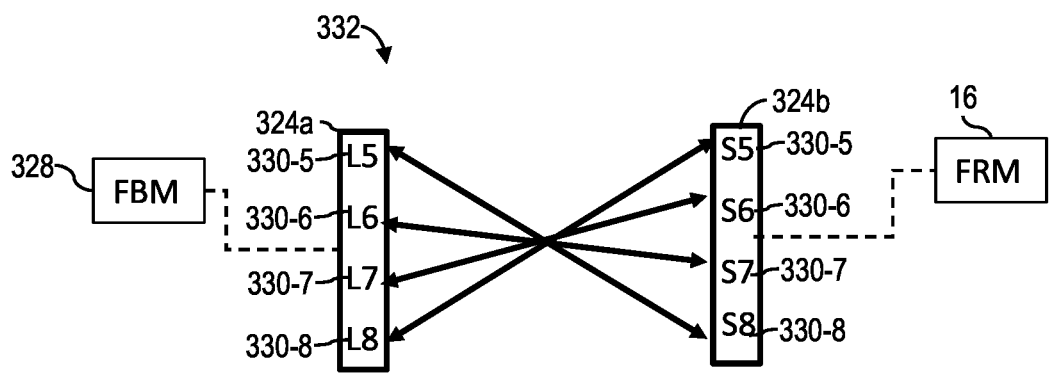
FIG. 6B is a diagram of an exemplary implementation of an MPO cross-over cable constructed in accordance with the present disclosure.

Referring now to FIG. 6B, shown therein is a diagram of an exemplary implementation of a cross-over cable 332 constructed in accordance with the present disclosure. The cross-over cable 332 is constructed such that the lowest numbered port on a first side is optically coupled to the highest numbered port on a second side and the second lowest numbered port on the first side is optically coupled to the second highest numbered port on the second side.

For example, as shown in FIG. 6B, a fifth port 330-5 of the FBM 328 is optically coupled to an eighth port 330-8 of the FRM 16, a sixth port 330-6 of the FBM 328 is optically coupled to a seventh port 330-7 of the FRM 16, a seventh port 330-7 of the FBM 328 is optically coupled to a sixth port 330-6 of the FRM 16, and an eighth port 330-8 of the FBM 328 is optically coupled to a fifth port 330-5 of the FRM 16.

Figure 7:
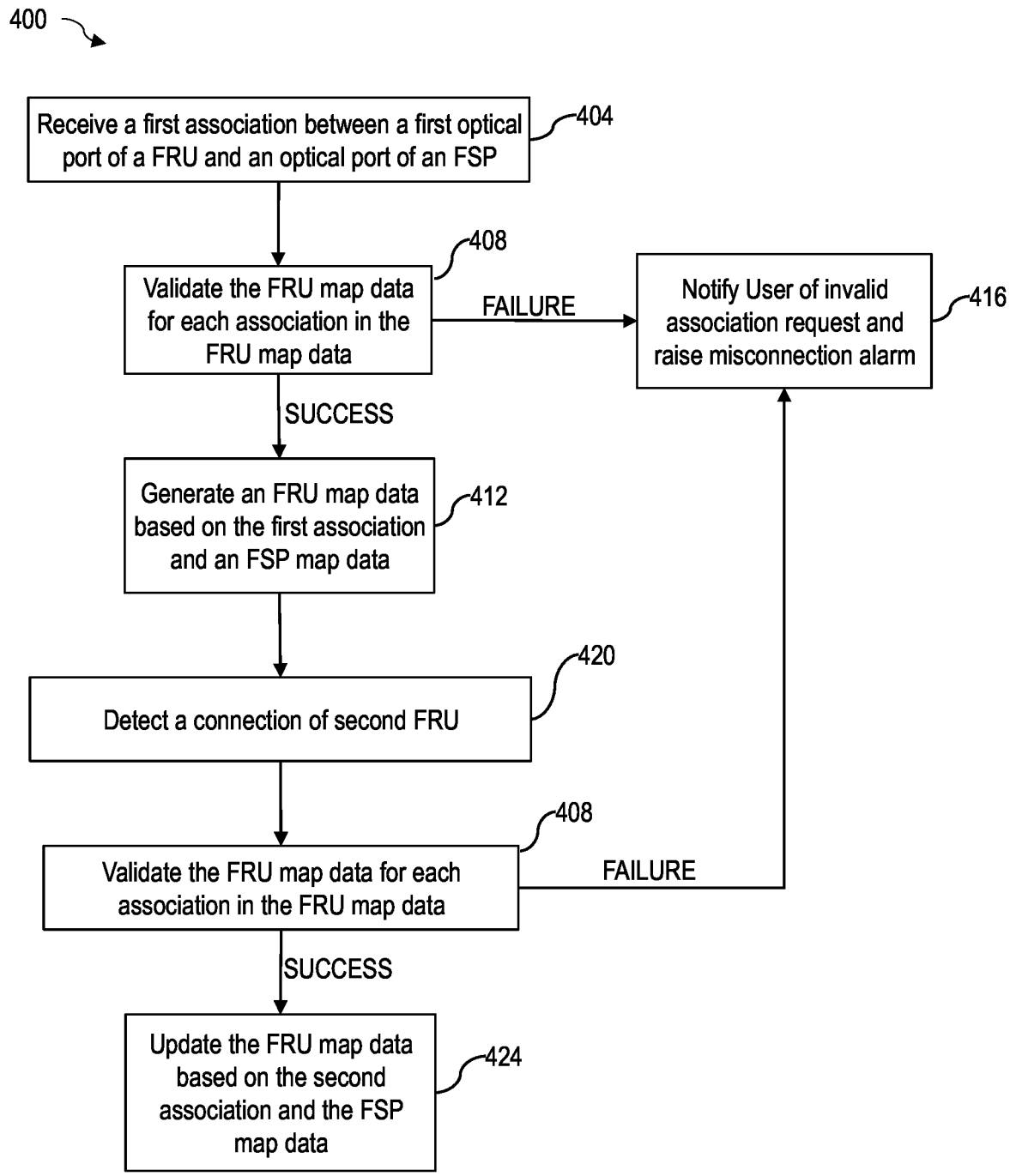
FIG. 7 is a process flow diagram of an exemplary implementation of a modelling process constructed in accordance with the present disclosure.

Referring now to FIG. 7, shown therein is a process flow diagram of an exemplary implementation of a provisioning process 400 constructed in accordance with the present disclosure. Generally, the provisioning process 400 comprises: receiving a first association between a first optical port of a field replaceable unit (FRU) and an optical port of an FSP (step 404); validating the FRU map data for the first association (step 408), and, upon successful validation, generating an FRU map data based on the first association and an FSP map data (step 412). The FSP map data is predetermined for a particular type of FSP. The provisioning process 400, upon unsuccessful validation, or failed validation, may proceed to notifying the user of an invalid association request (step 416). In one implementation, the provisioning process 400 may further include detecting a connection of a second FRU to the FSP (step 420), at which point the provisioning process 400 may repeat the validating step 408, however, upon successful validation, the provisioning process 400 may continue on to updating the FRU map data (step 424).

Generally, the provisioning process 400 enables a user to interact with the node 14, e.g., via a user interface such as a command line interface, a transaction Language 1 (TL1) interface, a terminal interface, or a graphical user interface, and/or the like, and provision all FRUs in the node 14 by making the first association, thereby reducing errors introduced during node provisioning and increasing uptime of the optical transport network 10. In one implementation, the user interface may be a Guided Association Prompt executed as software (such as the software application 48) by the node processor 42. Each FRU may be one or more of a FBM 328 and an FRM 16, for example. In one implementation, the provisioning process 400 may be implemented in the software application 48 stored in the node memory 46 and executed by the node processor 42. In one implementation, the provisioning process 400 may implement a connection agnostic API operable to receive one or more signal, e.g., via the communication device 44.

In one implementation, receiving a first association between a first optical port of a first field replaceable unit (FRU) and an optical port of an FSP 304 (step 404) includes receiving, by the node processor 42, a first association from the user, e.g., as a provisioning request. The first association being a relationship between a first optical port of the first FRU and a first optical port of an FSP. The first FRU may be one or more of a FBM 328 or an FRM 16, for example. In one implementation, the first association may be indicative of an association between a first port of the first FRU and a first connector port 95' of the FSP 304. In one embodiment, the first association may be indicative of an association between a first connector port 95 of the first FRU and the first connector port 95' of the FSP 304. Generally, the FSP 300 has two or more FRUs attached thereto, for example, the first FRU and a second FRU. In one implementation, the user may provide only one first association as part of the provisioning process 400, for example, as part of a "one-touch" ROADM provisioning process.

In one implementation, receiving a first association between a first optical port of the first field replaceable unit (FRU) and an optical port of an FSP (step 404) includes receiving, by the node processor 42, at least one first association for a particular FRU port from the user for each FRU optically coupled to the FSP. In this way, the user may provide a first association for one port of each FRU and all remaining ports of the FRU are automatically determined by generating the FRU map as described below.

In one implementation, receiving a first association between a first optical port of the first field replaceable unit (FRU) and an optical port of an FSP (step 404) includes retrieving, e.g., from the node memory 46, an FSP map data, having one or more internal association between each connector port 95' of the FSP 304.

In one implementation, validating the FRU map data for each association in the FRU map data (step 4108) includes checking one or more of an FRU compatibility, port compatibility, and dependent configurations. The FRU compatibility may include, for example, compatibility of a particular FRU having a particular FRU type and a particular FSP. For example, if, for a particular FSP, the FSP type is an Express type, the node processor 42 may provide a success indication if all FRUs connected to the particular FSP have an FRU type of FRM. Alternatively, if the FSP type is an FSP-CE, the node processor 42 may provide a success indication if only FRMs are attached to certain ports and only FBMs are attached to other certain ports.

In one implementation, validating the FRU map data for each association in the FRU map data (step 408) further includes indicating, e.g., by one or more output device 40, a status of the first association. The indication may include a success indication if the association is correctly configured or a failure indication if any association in the FRU map data is incorrectly configured.

In one implementation, the FRU map data includes an FspMpoId (e.g., an identifier to a first connector port number), FruPortId (e.g., an identifier to a particular optical port number), NeighborMpoId (e.g., an identifier to a particular second connector port number), and NeighborFruPortId (e.g., an identifier to a particular optical port number).

In one implementation, notifying the user of an invalid association request (step 416) may include sending, by the node processor 42, one or more failure indication to the one or more output device 40. For example, if the user provides a third association for which execution of the provisioning process 400 would result in a port having two different associations, e.g., conflict, with the second association, the node processor 42 may transmit the failure indication to the one or more output device 40.

In one implementation, notifying the user of an invalid association request (step 416) may further include raising a misconnection alarm. The misconnection alarm may be a failure indication transmitted to the one or more output device 40 or may be a failure indication otherwise displayed or presented to the user. In one embodiment, the misconnection may be a misconfiguration.

In one implementation, notifying the user of an invalid association request (step 416) may further include displaying, e.g., on the one or more output device 40, an expected port association based at least in part on the FSP map data. For example, the node processor 42 may cause the one or more output device 40 to display a graphical image of the FSP with a first indication of where a misconnection exists and a second indication of where the user should plug in the FRU to correct the misconnection.

In one implementation, after validating the FRU map data for each association in the FRU map data (step 408), the node processor 42 may receive a service activation request, and may cause a particular one of the FRUs to activate the service. In some implementations, the service activation request further includes an activation type, e.g., one of an express type and an add/drop type. In this implementation, the node processor 42 may cause a particular one of the FRUs to activate the service based on the activation type and the mode type.

In one implementation, generating the FRU map data based on the first association and the FSP map data (step 412) may only be performed after receiving the success indication.

In one implementation, generating an FRU map data based on the first association and an FSP map data (step 412) includes determining which FRU port 330 of the second FRU is optically coupled to a particular FRU port 330 of the first FRU, which may also be referred to as a neighbor port, e.g., a neighbor association. In one implementation, the node processor 42 may match the connector port 95' of the first association with the connector port 95' of the FSP map data to generate the second association, as detailed below.

In one implementation, referring back to FIG. 5B, for example, the FRM 16*a* is optically coupled to a first connector port 95'-1 and may be optically coupled to the FRM 16*b* via the first optical link pair 308-1, to the FRM 16*c* via the second optical link pair 308-2, to the FRM 16*d* via the third optical link pair 308-3, and to the FRM 16*e* via the fourth optical link pair 308-4. Each optical link pair 308 may be optically coupled to a particular optical port of the connector port 95' associated with each of the FRMs 16. Therefore, the FSP map data may include, for example, an array of port-pair IDs associating each optical port of a first connector port 95' and another particular optical port of a second connector port 95'. For example, the FSP map data may include a first association of a first FSP port 312-1 of the first connector port 95'-1 with a first FSP port 312-1 of the second connector port 95'-2, a second FSP port 312-2 of the first connector port 95'-1 with a first FSP port 312-1 of the third connector port 95'-3, a third FSP port 312-3 of the first connector port 95'-1 with a first FSP port 312-1 of the fourth connector port 95'-4, and a fourth FSP port 312-4 of the first connector port 95'-1 with a first FSP port 312-1 of the fifth connector port 95'-5. A similar FSP map data may be generated for each of the connector ports 95' of the FSP 304. It should be understood that each FSP port 312 is bidirectional, e.g., comprises a plurality of optical port pairs wherein each optical port pair is associated with an optical fiber link pair.

In this implementation, the user may provide the first association, such as a provisioned MPO port association, between the first FRU port 330-1 of the first field replaceable unit (FRU) and the first connector port 95'-1 of the FSP 304. The node processor 42, receiving the first association, may further associate the second FRU port 330-2, the third FRU port 330-3, and the fourth FRU port 330-4 of the first FRU with the first connector port 95'-1 of the FSP 304. Thus, if the MPO cable is used to optically couple the FRU with the FSP, and because the MPO cable is a cross-over cable, the first FRU port 330-1 is associated with the fourth FSP port 312-4 of the first connector port 95'-1, the second FRU port 330-2 is associated with the third FSP port 312-3, the third FRU port 330-3 is associated with the second FSP port 312-2, and the fourth FRU port 330-4 is associated with the first FSP port 312-1, each of the first connector port 95'-1. Similar association may be made for each FRU attached to the FSP 304 via an MPO cable.

Further, the node processor 42, by using the FSP map data, may generate a second association, such as a provisioned neighbor association, between the first FRU port 330-1 of the first FRU with a fourth FRU port 330-4 of a fifth FRU. The node processor 42 may further generate another association, such as a provisioned MPO port association, for each FRU port 330 of the fifth FRU indicative of a connection to a particular MPO port, e.g., the fifth connector port 95'-5, of the FSP 304. The node processor 42 may match the connector port 95' of the FRU map data with the connector port 95' of the FSP map data to generate the second association. For example, the first FRU port 330-1 of the first FRU is associated with the first connector port 95'-1 of the FSP 304, and thus the fourth FSP port 312-4, by the first association above. Based on the FSP map data, the fourth FSP port 312-4 of the first connector port 95'-1 is optically coupled to the first FSP port 312-1 of the fifth connector port 95'-5. As described above, the first FSP port 312-1 of the fifth connector port 95'-5 is associated with a fourth FRU port 330-4 of the fifth FRU. In this way, the node processor 42 may generate the second association, e.g., the provisioned neighbor association, between the first FRU port 330-1 of the first FRU with the fourth FRU port 330-4 of the fifth FRU.

Similarly, the node processor 42, by using the FSP map data, may generate a third association, such as a provisioned neighbor association, between the second FRU port 330-2 of the first FRU with a fourth FRU port 330-4 of a fourth FRU. The provisioned neighbor association may be performed by an auto-discovery process. The auto-discovery process may be executed by one or more FRU processor 54 of each FRU. The autodetection process may include broadcasting a first identifier (for example, a MAC address) via a particular FRU port 330 by a first FRU and receiving, e.g., via the communication network 34, a response indicative of a first access ID from the FRU processor 54 of a second FRU. The FRU processor 54 of the first FRU may subsequently transmit a second access ID to the second FRU, e.g., via the communication network 34. In this manner, the FRU processor 54 of the first FRU may have a first data indicative of the second FRU being connected to the particular FRU port 330 via the FSP, and the FRU processor 54 of the second FRU may have a second data indicative of the first FRU being connected to a particular FRU port 330 of the second FRU via the FSP. The FRU processor 54 of the first FRU and the FRU processor 54 of the second FRU may subsequently transmit the first data and the second data to the node processor 42.

In one implementation, the node processor 42 may further generate another association, such as a provisioned MPO port association, for each FRU port 330 of the fourth FRU indicative of a connection to a particular MPO port, e.g., the fourth connector port 95'-4, of the FSP 304. The node processor 42, by using the FSP map data, may generate a fourth association, such as a provisioned neighbor association, between the third FRU port 330-3 of the first FRU with a fourth FRU port 330-4 of a third FRU. The node processor 42 may further generate another association, such as a provisioned MPO port association, for each FRU port 330 of the third FRU indicative of a connection to a particular MPO port, e.g., the third connector port 95'-3, of the FSP 304. And the node processor 42, by using the FSP map data, may generate a fifth association, such as a provisioned neighbor association, between the fourth FRU port 330-4 of the first FRU with a fourth FRU port 330-4 of a second FRU. The node processor 42 may further generate another association, such as a provisioned MPO port association, for each FRU port 330 of the second FRU indicative of a connection to a particular MPO port, e.g., the second connector port 95'-2, of the FSP 304.

In one implementation, the aforementioned associations may be similarly created for each FRU optically coupled to the FSP; however, the user does not have to provide another association due to the previously generated associations.

In one implementation, each FRU port 330 of each FRU coupled to the FSP may further have a mode type or traffic mode type indicative of either an EXPRESS mode or an ADD/DROP mode, wherein the ADD/DROP mode is indicative of the FRU providing traffic turn up/turn down or service activation abilities, e.g., that the particular FRU port 330 is optically coupled to the coherent optical transceiver 100, and the EXPRESS mode is indicative of the particular FRU port 330 being optically coupled to passthrough one or more optical signal. In one implementation, the mode type may be determined based on the particular FRU. For example, for a particular FRU model, a first FRU port 330 may be an EXPRESS port having an EXPRESS mode, whereas a second FRU port 330 may be an ADD/DROP port having an ADD/DROP mode.

In one implementation, generating the FRU map data based on the first association and the FSP map data (step 412) includes receiving the first association indicative of the first port of the FRU being coupled to a two-MPO FSP, such as the FSP 320 illustrated in FIG. 6A. In this embodiment, the FSP map data indicates that a first FSP port of a first MPO port is coupled to a fourth FSP port of a second MPO port, a second FSP port of the first MPO port is coupled to a third FSP port of the second MPO port, a third FSP port of the first MPO port is coupled to a second FSP port of the second MPO port, and a fourth FSP port of the first MPO port is unconnected while a fourth FSP port of the second MPO port is coupled to a system port 322, such as an LC port, e.g., as a system port association.

In one implementation, this FRU map may be limited to instances where the first FRU is an FBM 328 and the second FRU is the FRM 16. In this way, the FRU map data may be generated such that the first port 330-1 of the FBM 328 is optically coupled to the fourth port 330-4 of the FRM 16, the second port 330-2 of the FBM 328 is optically coupled to the third port 330-3 of the FRM 16, the third port 330-3 of the FBM 328 is optically coupled to the second port 330-2 of the FRM 16, and the first port 330-1 of the FRM 16 is optically coupled to the system port 322.

In one implementation, detecting the connection of the second FRU (step 420) is performed by the node processor 42 without the user interacting with the one or more input devices 38. That is, detecting the connection of the second FRU (step 420) may be performed automatically by the node processor 42.

In one implementation, detecting the connection of the second FRU (step 420) further includes detecting when a second FRU is connected to the FSP. For example, the node processor 42 may receive one or more of the transmitted first data and second data by the FRU processor 54 of the first FRU and the FRU processor 54 of the second FRU as described above. The node processor 42, receiving the first data indicative of the second FRU being connected to the particular FRU port 330 via the FSP and the second data indicative of the first FRU being connected to a particular FRU port 330 of the second FRU via the FSP, may use one or more of the first data and the second data as the second association.

In one implementation, after detecting the connection of the second FRU (step 420), the provisioning process 400 may perform the validating the FRU map data for each association in the FRU map data (step 408), as described above in more detail; however, upon successful validation (e.g., upon receiving a success indication), the provisioning process 400 may continue to updating the FRU map data (step 424).

In one implementation, updating the FRU map data (step 424) further includes updating the FRU map data to include the second association determined in the detecting step 420 and as based on the FSP map data. In one implementation, updating the FRU map data (step 424) may be performed similar with the generating the FRU map data (step 412) with the exception that two associations (the first association and the second association) are provided.

In one implementation, updating the FRU map data (step 424) further includes providing each FRU port 330 of each FRU coupled to the FSP with a mode type or traffic mode type indicative of either an EXPRESS mode or an ADD/DROP mode, wherein the ADD/DROP mode is indicative of the FRU providing traffic turn up/turn down or service activation abilities, e.g., that the particular FRU port 330 is optically coupled to the coherent optical transceiver 100, and the EXPRESS mode is indicative of the particular FRU port 330 being optically coupled to passthrough one or more optical signal, for example. In one implementation, the mode type may be determined based on the particular FRU. For example, for a particular FRU model, a first FRU port 330 may be an EXPRESS port having an EXPRESS mode, whereas a second FRU port 330 may be an ADD/DROP port having an ADD/DROP mode.

In one implementation, each FRU may be optically coupled to more than one FSP. For example, as shown in FIG. 5B, each FRM 16 may have more than one connector port 95 and one or more of the connector ports 95 may be optically coupled to an FSP, such as the FSP 304, the FSP 306, and/or the FSP 320, or the cross-over cable 332, for example.

Figure 8:
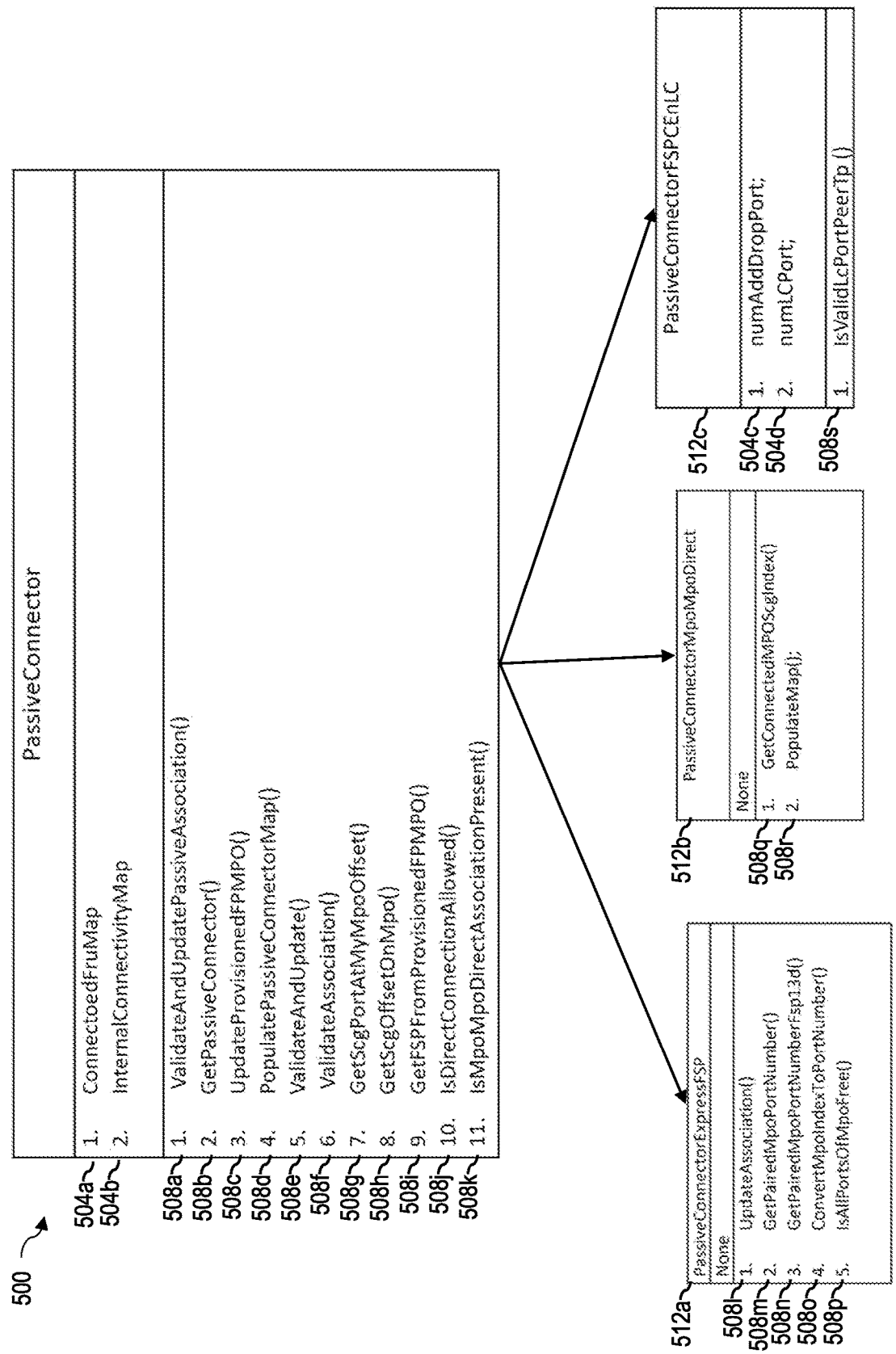
FIG. 8 is a functional diagram of an exemplary implementation of a Passive Connector class constructed in accordance with the present disclosure.

Referring now to FIG. 8, shown therein is a functional diagram of an exemplary implementation of a Passive Connector class 500 constructed in accordance with the present disclosure. The Passive Connector class 500 may be at least a part of the software application 48, executed by the node processor 42, and/or stored in the node memory 46, for example, and may be accessible by the FRU processor 54 of the FRU controller 52. The passive connector class 500 may include one or more property 504, such as a connected FRU map property 504 and an internal connectivity map 504b. Further, in some implementations, the passive connector class 500 includes one or more function 508, such as, by example only, a ValidateAndUpdatePassiveAssociation function 508a (validates the user-provided first association, for example, as described by step 408, step 416, and step 424), a GetPassiveConnector function 508b (e.g., given a FSP for a given port, the function will return the MPO port number of the FSP), an UpdateProvisionedFPMPO function 508c (update the FSP on a given FRU, e.g., providing at least a portion of the FSP map data to the FRU), a PopulatePassiveConnectorMap function 508d (updating the FRU map data, e.g., as described in step 424), a ValidateAndUpdate function 508e (e.g., validating the FRU map data as described in step 408 and updating the FRU map data as described in step 424), a ValidateAssociation 508f (e.g., validating the FRU map data as described in step 408), a GetScgPortAtMyMpoOffset function 508g (returns a port of an MPO for a given FRU port), a GetScgOffsetOnMpo function 508h (returns an FRU port for a given MPO port), a GetFSPFromProvisionedFPMPO function 508i (returns a particular connector port 95' for an FSP given a FRU port), an IsDirectConnectionAllowed function 508j (returns whether an MPO port can be directly connected to another MPO port without an FSP disposed between), and an IsMpoMpoDirectAssociationPresent function 508k (returns whether the FRU port is already occupied by an association). In one implementation, the functions 508 of the passive connector class 500 may be performed as part of the provisioning process 400.

In some implementations, one or more child class 512 is derived from the passive connector class 500. The one or more child class 512 may include a PassiveConnectorExpressFSP class 512a (associated with FSPs having an Express type, for example), a Passive Connector MpoMpoDirect class 512b (associated with the MPO Direct type such as shown in FIG. 6B), and a PassiveConnectorFSPCEnLC class 512c (associated with the FSP-CE type as shown in FIG. 6A). In some embodiments, additional child classes 512 may be present, such as a child class 512 directed to an FSP—S type (shown in FIG. 5C), for example.

In one implementation, the PassiveConnectorExpressFSP class 512a may further include one or more property 504 and one or more function 508 that extends the passive connector class 500. For example, the PassiveConnectorExpressFSP class 512a may include an UpdateAssociation function 508l (e.g., update the FRU map data and other properties of each FRU port), a GetPairedMpoPortNumber function 508m (returns a paired FSP MPO for a given MPO port), a ConvertMpoIndexToPortNumber function 508o (returns a port number for a given MPO port number), and an IsAllPortsOfMpoFree function 508p (returns TRUE if no MPO ports have an association). In one implementation, the functions 508 of the PassiveConnectorExpressFSP class 512a may be performed as part of the provisioning process 400.

In one implementation, the Passive Connector MpoMpoDirect class 512b may further include one or more property 504 and one or more function 508 that extends the passive connector class 500. For example, the Passive Connector MpoMpoDirect class 512b may include a GetConnectedMPOScgIndex function 508q (returns an FRU port for a given MPO) and a PopulateMap function 508r (update the FRU map, such as described in step 424 above). In one implementation, the functions 508 of the Passive Connector MpoMpoDirect class 512b may be performed as part of the provisioning process 400.

In one implementation, the PassiveConnectorFSPCEnLC class 512c may further include one or more property 504 and one or more function 508 that extends the passive connector class 500. For example, the PassiveConnectorFSPCEnLC class 512c may include a numAddDropPort property 504c (property describing a number of ADD/DROP ports), a numLCPort property 504d (property describing a number of LC ports), and a IsValidLcPortPeerTp function 508s (returns TRUE for an MPO port optically coupled to an LC port 322). In one implementation, the functions 508 of the PassiveConnectorFSPCEnLC class 512c may be performed as part of the provisioning process 400.

The Passive Connector class 500, properties 504, functions 508, and child classes 512a-c are provided for exemplary purposes only and are not intended to limit the disclosure. Each of the Passive Connector class 500, properties 504, functions 508, and child classes 512a-c may have the same or different name and may have the same or different properties 504, functions 508, and child classes 512a-c. Further, each child class 512 may have further nestled classes as desired.

Figure 9:
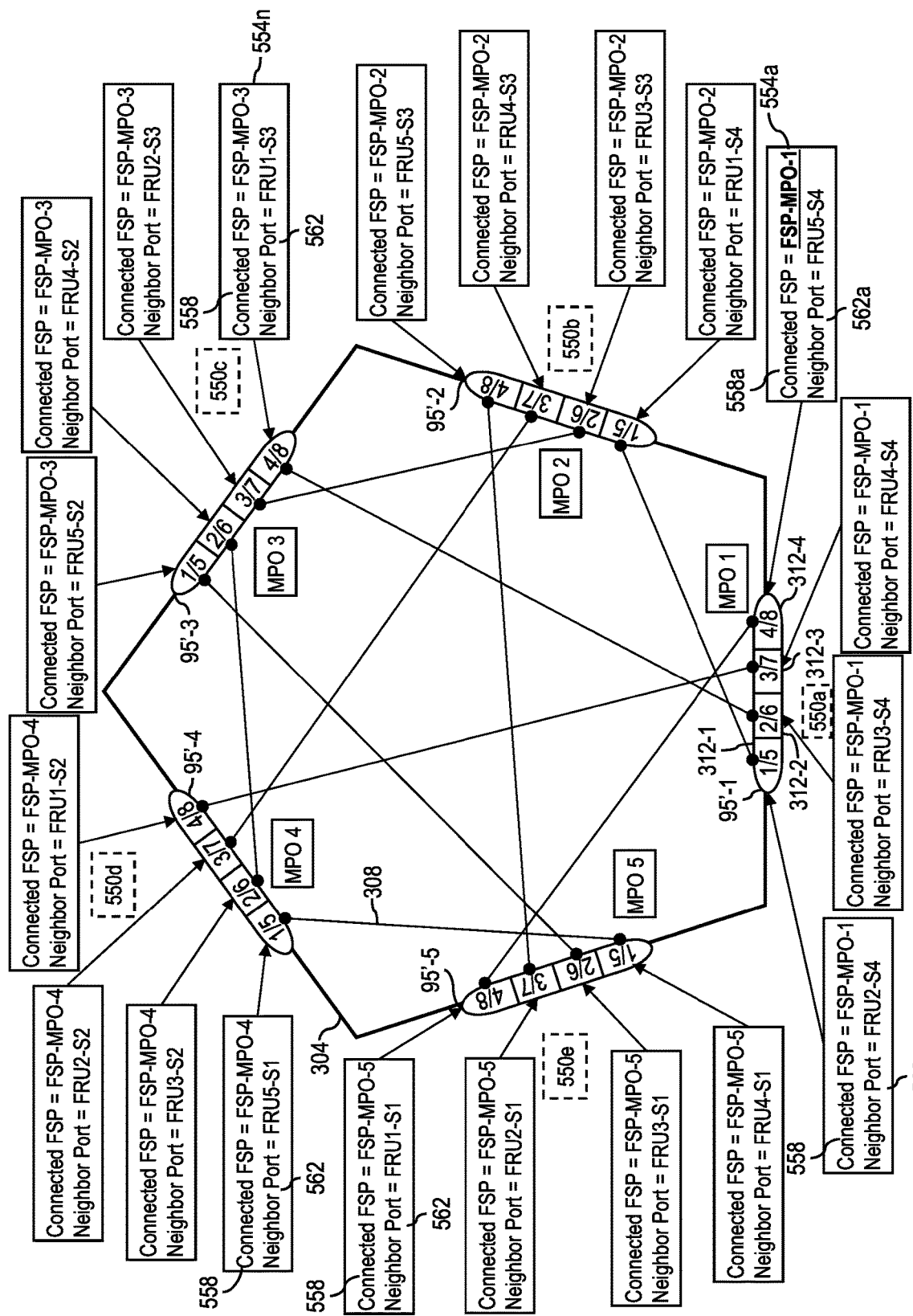
FIG. 9 is a diagram of an illustrative embodiment of the fiber shuffle panel of FIG. 5B constructed in accordance with the present disclosure showing associations for each FSP port of each connector port when the connector ports of the FSP are fully populated.

Referring now to FIG. 9, shown therein is a diagram of an exemplary implementation of the FSP 304 of FIG. 5B constructed in accordance with the present disclosure, with the exception that the FSP 304 of FIG. 9 is optically coupled to a plurality of FRUs 550a-e instead of FRMs 16a-e, respectively. The FSP 304 comprises the plurality of connector ports 95'-1 through 95'-5, illustrated as MPO 1 through MPO 5, respectively. Further shown is a plurality of FRUs 550a-e having a plurality of associations 554 (e.g., associations 554a-n) having both a connected FSP property 558 and a neighbor port property 562.

In one implementation, a first association 554a may be the first association provided by the user as described above in relation to step 404 of the provisioning process 400, for example. The first association 554a may have a first FSP property 558a of "FSP-MPO-1" and a first neighbor port property 562a of "FRU5-S4". As described above, the FRU map data may include an FspMpoId (i.e., the '1' in the first FSP property 558a of "FSP-MPO-1" of the first association 554a wherein the '1' corresponds to the first connector port 95'-1), FruPortId (i.e., the first FRU port 330-1 of the FRU 550a), NeighborMpoId (i.e., an identifier of the fifth connector port 95'-5), and NeighborFruPortId (i.e., the "S4" of the first neighbor port property 562a of "FRU5-S4" corresponding to the fourth FRU port 330-4 of the FRU 550e).

In this way, the user provided first association, having a provisioned MPO port association, between the first FRU port 330-1 of the first field replaceable unit (FRU) and the first connector port 95'-1 of the FSP 304, as described above, may be used to generate at least the FspMpoId property and the FruPortId property of the FRU map data, while neighbor association (e.g., the NeighborMpoId and the NeighborFruPortId of the FRU map data) may be generated by the auto-discovery process as described above.

In one implementation, as shown in FIG. 9, each connector port 95' may have one or more FSP port 312 having an optical port number. For example, MPO 1 (i.e., first connector port 95'-1) has the first FSP port 312-1 with optical port numbers "1" and "5", the second FSP port 312-2 with optical port numbers "2" and "6", the third FSP port 312-3 with optical port numbers "3" and "7", and the fourth FSP port 312-4 with optical port numbers "4" and "8".

In one implementation, FIG. 9 shows associations for each FSP port 312 of each connector port 95' when the connector ports 95' of the FSP 304 are fully populated.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features and steps are recited in the claims and/or disclosed in the specification, these combinations are not intended to limit the disclosure. In fact, many of these features and steps may be combined in ways not specifically recited in the claims and/or disclosed in the specification. Although each dependent claim listed below may directly depend on only one other claim, the disclosure includes each dependent claim in combination with every other claim in the claim set.

Similarly, although each illustrative embodiment listed above may directly depend on only one other illustrative embodiment, the disclosure includes each illustrative embodiment in combination with every other illustrative embodiment in the set of illustrative embodiments for each mode of the inventive concepts disclosed herein.

No element, act, or instruction used in the present application should be construed as critical or essential to the disclosure unless explicitly described as such outside of the preferred embodiment. Further, the phrase "based on" is intended to mean "based, at least in part, on" unless explicitly stated otherwise.

What is claimed is:

1. A node, comprising:
a fiber shuffle panel comprising:
a first connector having a plurality of first optical port pairs; and
a second connector having a plurality of second optical port pairs, at least one of the second optical port pairs is optically coupled to at least one of the plurality of first optical port pairs;
a first field replaceable unit having a plurality of third optical port pairs and a third connector optically coupled to the first connector via a first fiber optic cable;
a second field replaceable unit having a plurality of fourth optical port pairs and a fourth connector optically coupled to the second connector via a second fiber optic cable; and
a node controller comprising a node processor and a node memory, the node memory comprising a non-transitory processor-readable medium storing a Fiber Shuffle Pair (FSP) map data and processor-executable instructions that when executed by the node processor cause the node processor to:
receive a first association between at least one of the third optical port pairs and one of the first connector and the second connector;
validate the first association;
generate an FRU map data based on the first association and the FSP map data; the FRU map data comprising a plurality of second associations between each of the plurality of third optical port pairs and the plurality of fourth optical port pairs;
update a mode type for each of the second associations;
receive an activation request to activate one or more service; and
cause one or more field replaceable unit to activate the one or more service,
wherein the FSP map data comprises a plurality of third associations between each of the plurality of first optical port pairs and the plurality of second optical port pairs.

2. The node of claim 1, wherein each of the first connector and the second connector is a multi-fiber push on (MPO) connector.

3. The node of claim 1, wherein the fiber shuffle panel further comprises a waveguide and wherein a first one of the at least one second optical port pair is optically coupled to a first one of the at least one first optical port pair via the waveguide.

4. The node of claim 1, wherein the fiber shuffle panel is an express fiber shuffle panel.

5. The node of claim 1, wherein the fiber shuffle panel is a colorless, directionless, and contentionless express fiber shuffle panel.

6. The node of claim 1, wherein the fiber shuffle panel includes a multi-fiber push on (MPO) cross-over cable.

7. The node of claim 1, wherein each of the first field replaceable unit and the second field replaceable unit is one of a flex ROADM module and a flex broadcast module.

8. The node of claim 7, wherein the node memory further stores processor-executable instructions that when executed by the node processor cause the node processor to:
set a traffic mode type as express on each optical port pair of the first optical port pairs, the second optical port pairs, the third optical port pairs, and the fourth optical port pairs if both of the first field replaceable unit and the second field replaceable unit is a flex ROADM module.

9. The node of claim 1, wherein the fiber shuffle panel further comprises:

a system port optically coupled to a particular optical port pair of the plurality of first optical port pairs and the plurality of second optical port pairs; and wherein the FSP map data comprises a system port association between the system port and the particular optical port pair and the plurality of third associations is between each remaining of the plurality of first optical port pairs and the plurality of second optical port pairs.

10. The node of claim 9, wherein the system port is a first system port, the fiber shuffle panel further comprising:

a second system port optically coupled to a second particular optical port pair of the plurality of first optical port pairs and the plurality of second optical port pairs; and wherein the FSP map data further comprises a second system port association between the second system port and the second particular optical port pair.

11. The node of claim 1, wherein the node memory further stores processor-executable instructions that when executed by the node processor cause the node processor to:

receive a fourth association between at least one of the fourth optical port pairs and the other of the first connector and the second connector; and generate the FRU map data based on the first association, the fourth association, and the FSP map data, the FRU map data further comprising the plurality of second associations between each of the plurality of third optical port pairs and the plurality of fourth optical port pairs.

12. The node of claim 1, further comprising a third field replaceable unit having a plurality of fifth optical port pairs and a fifth connector, and the fiber shuffle panel further comprising a third connector having a plurality of sixth optical port pairs, at least one of the sixth optical port pairs optically coupled to the first connector and at least one of the sixth optical port pairs optically coupled to the second connector, and wherein the node memory further stores processor-executable instructions that when executed by the node processor cause the node processor to:

receive a fifth association between at least one of the fifth optical port pairs and the third connector; and generate the FRU map data based on the first association, the fifth association, and the FSP map data, the FRU map data further comprising the plurality of second associations between each of the plurality of third optical port pairs and the plurality of fourth optical port pairs.

13. The node of claim 1, wherein the node memory further stores processor-executable instructions that when executed by the node processor cause the node processor to:

validate the FRU map data by generating a status of the FRU map data for each of the second associations, the status being a success indication if the associations in the FRU map data are correctly configured or a failure indication if any of the associations in the FRU map data are incorrectly configured.

14. The node of claim 13, wherein the node further comprises one or more output device, and wherein the memory further stores processor-executable instructions that when executed by the node processor cause the node processor to:

activate the one or more output device based on the status of the FRU map data.

15. The node of claim 13, wherein the node further comprises one or more output device and one or more input device, and wherein the memory further stores processor-executable instructions that when executed by the node processor cause the node processor to:

display a user interface on the one or more output device, the user interface having a guided association prompt;

receive the first association between at least one of the third optical port pairs and one of the first connector and the second connector from the user interface via the one or more input device; and display the status of the FRU map data for each of the second associations on the user interface.

16. A method, comprising:

receiving a provisioning request having a first association between at least one of a plurality of first optical ports of a first connector of a first field replaceable unit and a fiber shuffle panel;

generating, by a node processor, an FRU map data based on the first association and a FSP map data stored in a non-transitory processor-readable medium, the FRU map data comprising one or more second association of one or more of the plurality of first optical ports of the first connector with one or more of a plurality of second optical ports of a second connector of a second field replaceable unit and one or more of a plurality of third optical ports of a third connector of a third field replaceable unit;

receiving, by the node processor, a service activation request; and determining two or more of the first field replaceable unit, the second field replaceable unit, and the third field replaceable unit to activate based on the service activation request and the FRU map data.

17. The method of claim 16, further comprising:

validating the FRU map data for each of the second associations; and generating one or more of a success indication if the associations of the FRU map data are valid and a failure indication if the associations of the FRU map data are not valid.

18. The method of claim 17, further comprising:

displaying one or more of the success indication or the failure indication on a user interface associated with one or more output device.

19. The method of claim 16, wherein generating, by a node processor, an FRU map data further comprises determining a traffic mode type as one or more of an express mode and an add/drop mode.

20. The method of claim 19, wherein the service activation request further includes a service type being one of an Express type and an add/drop type, and wherein determining the two or more field replaceable units to activate further comprises:

determining the two or more field replaceable units to activate based on the service activation request, the service type, the traffic mode type, and the FRU map data;

wherein the two or more field replaceable units are two or more of the first field replaceable unit, the second field replaceable unit, and the third field replaceable unit.

* * * * *